Patented Aug. 7, 1928.

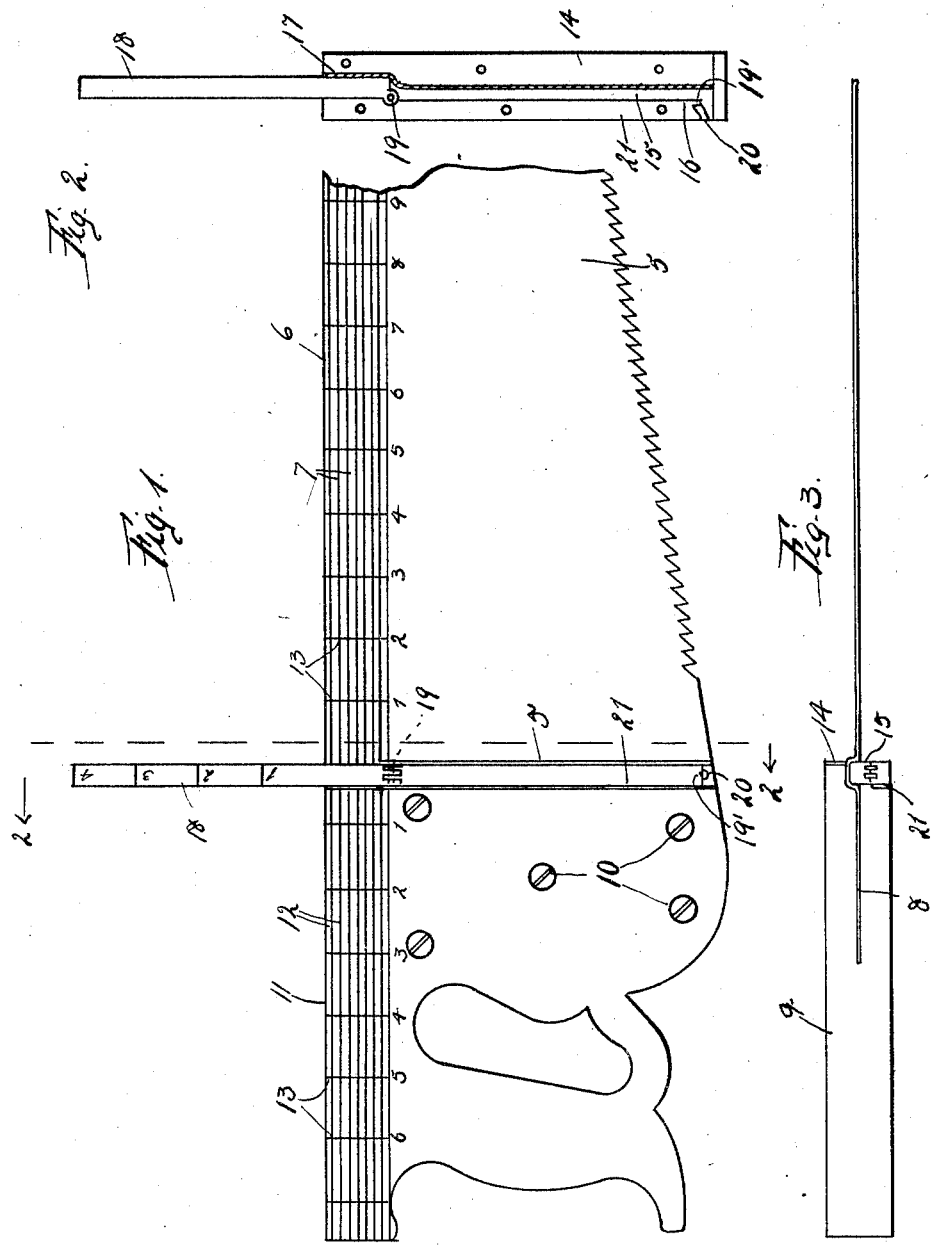

1,679,933

UNITED STATES PATENT OFFICE.

WILLIAM V. DORSANEO, OF DEVON, PENNSYLVANIA.

COMBINATION SAW AND SQUARE.

Application filed December 9, 1927. Serial No. 238,792.

My invention relates to new and useful improvements in a combination saw and square, and has for its primary object to provide an exceedingly simple and effective device of this character which will be compact, strong and durable, and so arranged as to reduce to a minimum, the likelihood of the square getting out of order.

Another object of the invention is to provide a chamber for the reception of the hinged square arm when the latter is in a closed position, at which time it may be used for use on short or narrow work.

A further object of the invention is to produce a pocket in the saw blade for the reception of a portion of the hinged extensible arm whereby said arm will be accurately held at right angles to the back edge of the saw.

A still further object of the invention is to provide scales or measuring devices which may be utilized in connection with the saw and square.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1 is a side elevation or face view of a combination saw and square constructed in accordance with my invention, showing the extensible arm in an open position with a part of the saw blade broken away;

Fig. 2 is a section on the line 2—2 of Fig. 1; and

Fig. 3 is a back edge view thereof with the extensible arm in a closed position.

In carrying out my invention as herein embodied, 5 represents a saw blade of any desirable length and for any of the well-known purposes, having a straight back edge 6 from end to end; and on the face of said blade adjacent said back edge, are delineated in any suitable or well-known way, a plurality of lines 7 parallel with each other and with said back edge, the said lines being spaced from each other and the back edge, any desirable sub-divisions of standard measurement, as sixteenths of an inch. Such an arrangement permits the party using a saw to make a cut which, in his judgment, is the proper depth and to then insert the back of the saw in said cut, at which time the lines 7 will indicate the depth to which the cut has been made, and if not of the proper depth, he may then proceed to make the cut deeper.

This blade is inserted in a slot 8 in the handle 9 and there held by suitable fastening devices 10, such as screws. The handle is a continuation of the back edge 6 of the saw blade, and on one or both faces of said handle may be delineated lines 12 parallel with each other and with the edge 11 and in endwise alinement with the lines 7, so that said handle may be used for measuring the depth of cutaway portions or notches which are of sufficient size to receive said handle.

Lengthwise of the blade and handle are delineated other divisions of measurement 13, and they may denote inches and any subdivision thereof desired.

The inner edges of the handle are at right angles to the back edge of the saw blade as well as the edge 11 of the handle, and if said handle is of wood, or other relatively soft material, they may be covered with plates 14 and 15 of steel or other metal; and one of these edges is cut out to provide a chamber 16 of a depth less than the thickness of the handle on one side of the blade so as to leave the edge 15 intact and this chamber may run completely from the back edge to the front edge of the saw, although I prefer to terminate said chamber short of said front edge of the saw as plainly shown in Figs. 1 and 2. At the back edge of the saw, the handle is further cut away and the saw blade upset or depressed to form a pocket 17.

Within the chamber 16, adjacent the back edge of the saw or at the inner end of the pocket 17, is hinged an extensible square arm 18 as at 19, the hinge being of a form such as often used in folding rules and the close fitting arrangement of which will retain said extensible arm in an open or closed position. Of course, if desirable, a frictional or other suitable latch 19' may be used to hold said extensible arm in a closed position, and at the lower end of the chamber 16 is provided a notch 20 into which an operator's finger or a tool may be inserted for gripping the end of the extensible arm to open the same.

The pocket 17 is so located as to receive a portion of the hinged end of the extensible arm when the latter is moved to its open position as shown in Fig. 2, and as the extensible arm snugly fits within the pocket, and the sides of said pocket are at right angles to the back edge 6 of the blade, said extensible arm will be accurately and positively held at right angles to the back edge of the saw blade when the parts are positioned for use.

It is to be understood that the extensible arm 18 is so mounted that the edge facing toward the outer end of the saw blade is flush with the inner edge of the saw handle or the face plates covering the same, and when in an open position, as shown in Figs. 1 and 2, forms an extension of the inner face of the handle or the face plate 15 covering the same.

When the extensible arm 18 is in the open position, it provides with the inner edge of the handle a long surface for use for abutment against a piece of work, so that a mark produced with the edge 11 of the handle or the back edge 6 of the saw, as a straight edge, will be at right angles to the edge of the work with which the square coacts.

If found desirable, either or both walls of the cutaway portions of the handle to form the chamber 16, may be covered with face plates, one of which is shown and designated by the numeral 21.

Of course I do not wish to be limited to the exact details of construction as herein shown, as these may be varied within the limits of the appended claims without departing from the spirit of my invention.

Having thus fully described my invention, what I claim as new and useful is:

1. A combination saw and square, comprising, in combination, a saw blade having a straight back edge and provided with an up-set portion to form a pocket at the back edge, said saw also having measures delineated thereon, a handle fixed to the blade and having an inner edge at right angles to the back edge of the blade, said handle having a recess in its inner edge on one side of the blade, said recess alining with the pocket, and an extensible arm hinged to the handle for insertion in the recess when in a closed position and for registration with the pocket when in an open position, the walls of said pocket positively positioning the extensible arm at right angles to the back of the blade.

2. In combination, a saw blade having a straight back edge and provided with measurement indications delineated thereon, said blade having an upset portion to provide a pocket, the side walls of which are at right angles to the back edge of the blade, a handle fixed on said blade and having an edge in alinement with the back edge of the blade and also provided with measure indications delineated thereon, said handle having a cutaway portion at one side of the blade in alinement with the pocket in said blade, the recess formed by the cutaway portion being of less depth than the thickness of the handle material on one side of the blade, providing a straight edge at right angles to the back edge of the blade, an extensible arm hinged within the recess of the handle which it occupies when in a closed position, said extensible arm when opened snugly fitting the pocket at right angles to the back of said blade, and means to hold said extensible arm in a closed position.

In testimony whereof, I have hereunto affixed my signature.

WILLIAM V. DORSANEO.